(12) United States Patent
Tao et al.

(10) Patent No.: US 12,411,550 B2
(45) Date of Patent: Sep. 9, 2025

(54) TACTILE FEEDBACK DEVICE, DISPLAY APPARATUS, AND TACTILE FEEDBACK METHOD

(71) Applicants: Beijing BOE Technology Development Co., Ltd., Beijing (CN); BOE Technology Group Co., Ltd., Beijing (CN)

(72) Inventors: Yongchun Tao, Beijing (CN); Yuju Chen, Beijing (CN); Yingzi Wang, Beijing (CN)

(73) Assignees: BEIJING BOE TECHNOLOGY DEVELOPMENT CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/787,404

(22) PCT Filed: Aug. 30, 2021

(86) PCT No.: PCT/CN2021/115325
§ 371 (c)(1),
(2) Date: Jun. 20, 2022

(87) PCT Pub. No.: WO2023/028756
PCT Pub. Date: Mar. 9, 2023

(65) Prior Publication Data
US 2024/0184365 A1 Jun. 6, 2024

(51) Int. Cl.
*G06F 3/01* (2006.01)
*B06B 1/02* (2006.01)
(Continued)

(52) U.S. Cl.
CPC ............ *G06F 3/016* (2013.01); *B06B 1/0253* (2013.01); *B06B 1/0622* (2013.01); *G06F 3/04164* (2019.05); *G06F 3/0446* (2019.05)

(58) Field of Classification Search
CPC ...... G06F 3/016; G06F 3/04164; G06F 3/041; B06B 1/0253; B06B 1/0622
See application file for complete search history.

(56) References Cited

U.S. PATENT DOCUMENTS

| 9,746,923 | B2 * | 8/2017 | Cruz-Hernandez ..... G06T 15/04 |
| 2005/0253643 | A1 * | 11/2005 | Inokawa ................ G06F 3/0421 29/25.35 |

(Continued)

FOREIGN PATENT DOCUMENTS

| CN | 1678978 A | 10/2005 |
| CN | 102349039 A | 2/2012 |

(Continued)

*Primary Examiner* — Temesghen Ghebretinsae
*Assistant Examiner* — K. Kiyabu
(74) *Attorney, Agent, or Firm* — Nath, Goldberg & Meyer; Joshua B. Goldberg

(57) ABSTRACT

The present disclosure provides a tactile feedback device having a sensing area and a feedback area surrounding the sensing area; wherein the tactile feedback device includes: a base substrate, a touch element in the sensing area, a piezoelectric element in the feedback area, and a tactile feedback driving component, on the base substrate; and wherein the tactile feedback driving component is configured to: determine a touch position in response to a touch data acquired by the touch element; determine a corresponding driving signal according to at least a touch area where the touch position is located; and input the driving signal to the piezoelectric element to drive the piezoelectric element to generate a tactile feedback. The present disclosure also provides a display apparatus and a tactile feedback method.

18 Claims, 6 Drawing Sheets

(51) Int. Cl.
*B06B 1/06* (2006.01)
*G06F 3/041* (2006.01)
*G06F 3/044* (2006.01)

(56) References Cited

U.S. PATENT DOCUMENTS

| | | | |
|---|---|---|---|
| 2007/0080951 A1* | 4/2007 | Maruyama | G06F 3/016 |
| | | | 345/173 |
| 2008/0024459 A1* | 1/2008 | Poupyrev | G06F 3/0488 |
| | | | 345/173 |
| 2011/0053653 A1* | 3/2011 | Tho | H04M 1/0249 |
| | | | 455/566 |
| 2011/0193824 A1* | 8/2011 | Modarres | G06F 3/016 |
| | | | 345/177 |
| 2014/0132568 A1* | 5/2014 | Hirose | G06F 3/044 |
| | | | 345/175 |
| 2016/0357257 A1* | 12/2016 | Lim | G06F 3/016 |
| 2017/0097681 A1* | 4/2017 | Ono | G06F 3/016 |
| 2017/0168574 A1* | 6/2017 | Zhang | G06F 3/016 |
| 2019/0064997 A1* | 2/2019 | Wang | G06F 3/04886 |
| 2019/0326908 A1* | 10/2019 | Salter | B60Q 3/43 |
| 2019/0346924 A1* | 11/2019 | Han | G06F 3/016 |
| 2021/0141456 A1* | 5/2021 | Neuwirth | G06F 3/016 |
| 2021/0286430 A1* | 9/2021 | Schwab | B60K 35/50 |
| 2022/0285451 A1* | 9/2022 | Hong | G06F 3/0446 |
| 2023/0044562 A1* | 2/2023 | Rosenberg | G06F 1/1662 |

FOREIGN PATENT DOCUMENTS

| | | | |
|---|---|---|---|
| CN | 102591512 A | | 7/2012 |
| CN | 110703955 A | * | 1/2020 |
| CN | 115993884 A | * | 4/2023 |

\* cited by examiner

TACTILE FEEDBACK DEVICE, DISPLAY APPARATUS, AND TACTILE FEEDBACK METHOD

This is a National Phase Application filed under 35 U.S.C. 371 as a national stage of PCT/CN2021/115325, filed Aug. 30, 2021, the content of which is hereby incorporated by reference in its entirety.

TECHNICAL FIELD

The present disclosure relates to the field of touch display technology, and in particular, to a tactile feedback device, a display apparatus, and a tactile feedback method.

BACKGROUND

With the continuous development of touch display technology, the touch operation has penetrated into various aspects of people's life, and many electronic products, including mobile terminals, personal computers, electrical equipment, etc., have supported touch functions. Main modes of sensing a system by the human include visual sense, auditory sense, tactile sense and the like; current means of sensing and presenting of visual sense and the auditory sense is mature; by contrast, a current demand for a tactile feedback is increasing. It is a problem to be solved urgently how to realize a real tactile feedback during touch interaction.

SUMMARY

The present disclosure is directed to solving at least one of the technical problems in the related art, and provides a tactile feedback device, a display apparatus, and a tactile feedback method.

To achieve the above objects, in a first aspect, an embodiment of the present disclosure provides a tactile feedback device, having a sensing area and a feedback area surrounding the sensing area; wherein the tactile feedback device includes: a base substrate, and a touch element, a piezoelectric element and a tactile feedback driving component on the base substrate, wherein the touch element is in the sensing area, and the piezoelectric element is in the feedback area; and wherein the tactile feedback driving component is configured to: determine a touch position in response to a touch data acquired by the touch element; determine a corresponding driving signal according to at least the touch area where the touch position is located; and input the driving signal to the one or more piezoelectric elements to drive the one or more piezoelectric elements to generate a tactile feedback.

In some embodiments, the tactile feedback driving component includes: a data analysis element, a signal determination element and a signal generation element; the data analysis element is configured to determine, in response to the touch data acquired by the touch element, a touch action type and the touch position; the signal determination element is configured to determine the driving signal according to the touch area where the touch position is located and the touch action type; and the signal generation element is configured to generate and output the driving signal.

In some embodiments, the signal determination element is configured to determine that the driving signal is a first high-frequency continuous wave signal in response to the touch area where the touch position is located being an edge area of an object and the touch action type being a slide type.

In some embodiments, the signal determination element is configured to determine that the driving signal is a low-frequency square wave pulse signal in response to the touch area where the touch position is located being an internal area of an object and the touch action type being a press type.

In some embodiments, the signal determination element is configured to determine that the driving signal is a second high-frequency continuous wave signal in response to the touch area where the touch position is located being a stripe area and the touch action type being a slide type.

In some embodiments, the piezoelectric element includes: a first electrode, a piezoelectric film, and a second electrode sequentially stacked along a direction away from the base substrate.

In some embodiments, the tactile feedback driving component is configured to load the driving signal between the first electrode and the second electrode of the piezoelectric element to drive the piezoelectric element to generate the tactile feedback.

In some embodiments, the touch element includes a plurality of touch electrodes, a plurality of sensing electrodes and an interlayer insulating layer between a layer in which the plurality of touch electrodes are located and a layer in which the plurality of sensing electrodes are located; orthographic projections of the plurality of touch electrodes and the plurality of sensing electrodes on the base substrate intersect with each other; and the plurality of touch electrodes and the first electrode are arranged in a same layer, and the plurality of sensing electrodes and the second electrode are arranged in a same layer.

In some embodiments, a distance between the piezoelectric element and the sensing area is greater than or equal to 100 micrometers.

In some embodiments, the piezoelectric element includes a plurality of piezoelectric elements at least on two opposite sides of the sensing area.

In some embodiments, the plurality of piezoelectric elements are uniformly distributed around the sensing area.

In a second aspect, an embodiment of the present disclosure further provides a display apparatus, including: a display substrate and a tactile feedback device on a display side of the display substrate, wherein the tactile feedback device is the tactile feedback device of any one of the above embodiments.

In a third aspect, an embodiment of the present disclosure further provides a tactile feedback method applied to a tactile feedback device, wherein the tactile feedback device has a sensing area and a feedback area surrounding the sensing area, wherein the tactile feedback device includes: a base substrate, and a touch element, a piezoelectric element and a tactile feedback driving component on the base substrate, wherein the touch element is in the sensing area, and the piezoelectric element is in the feedback area; and wherein the method includes: determining a touch position in response to a touch data acquired by the touch element; determining a corresponding driving signal according to at least a touch area where the touch position is located; and inputting the driving signal to the one or more piezoelectric elements to drive the one or more piezoelectric elements to generate a tactile feedback.

In some embodiments, the determining a touch position in response to a touch data acquired by the touch element includes: determining a touch action type and the touch position according to the touch data; and the determining a corresponding driving signal according to at least the touch area where the touch position is located and inputting the driving signal to the one or more piezoelectric elements includes: determining the driving signal according to the touch area where the touch position is located and the touch action type.

In some embodiments, the determining the driving signal according to the touch area where the touch position is located and the touch action type includes: determining that the driving signal is a first high-frequency continuous wave signal, in response to the touch area where the touch position is located being an edge area of an object and the touch action type being a slide type; determining that the driving signal is a low-frequency square wave pulse signal, in response to the touch area where the touch position is located being an internal area of an object and the touch action type being a press type; and determining that the driving signal is a second high-frequency continuous wave signal in response to the touch area where the touch position is located being a stripe area and the touch action type being a slide type.

BRIEF DESCRIPTION OF DRAWINGS

The accompanying drawings, which are provided for further understanding of the present disclosure and constitute a part of this specification, are for explaining the present disclosure together with the embodiments of the present disclosure, but are not intended to limit the present disclosure. The above and other features and advantages will become more apparent to one of ordinary skill in the art by describing detailed exemplary embodiments thereof with reference to the drawings. In the drawings.

DETAIL DESCRIPTION OF EMBODIMENTS

In order to enable one of ordinary skill in the art to better understand the technical solutions of the embodiments of the present disclosure, a tactile feedback device, a display apparatus, and a tactile feedback method of the present disclosure will be described in further detail with reference to the accompanying drawings.

Example embodiments will be described more fully hereinafter with reference to the accompanying drawings, but may be embodied in different forms and should not be construed as limited to the embodiments set forth herein. Rather, these embodiments are provided so that the present disclosure will be thorough and complete, and will fully convey the scope of the present disclosure to one of ordinary skill in the art.

Terms used herein are only for describing particular embodiments and are not intended to limit the present disclosure. As used herein, the singular forms "a", "an" and "the" are intended to include the plural forms as well, unless the context clearly indicates otherwise. It will be further understood that the terms "includes" and/or "made of", when used in this specification, specify the presence of stated features, integers, steps, operations, elements, and/or components, but do not exclude the presence or addition of one or more other features, integers, steps, operations, elements, components, and/or groups thereof.

It will be understood that although the terms "first", "second", and the like may be used herein to describe various elements, these elements should not be limited by these terms. These terms are only used to distinguish one element from another. Thus, a first element, a first component, or a first module discussed below could be referred to as a second element, a second component, or a second module without departing from the teachings of the present disclosure.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the related art and the present disclosure, and will not be interpreted in an idealized or overly formal sense, unless expressly so defined herein.

Figure 1:
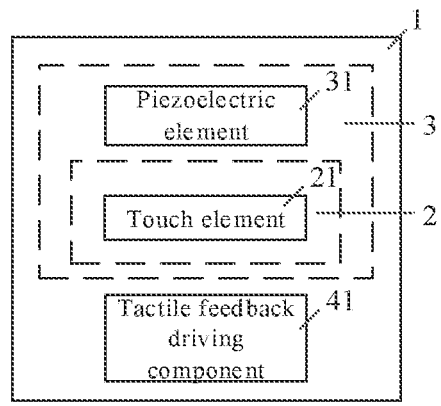
FIG. 1 is a schematic structural diagram of a tactile feedback device according to an embodiment of the present disclosure.

FIG. 1 is a schematic structural diagram of a tactile feedback device according to an embodiment of the present disclosure. As shown in FIG. 1, a tactile feedback device includes a sensing area 2 and a feedback area 3 surrounding the sensing area 2; the tactile feedback device includes: a base substrate 1, and a touch element 21, a piezoelectric element 31 and a tactile feedback driving component 41 on the base substrate 1. The touch element 21 is in the sensing area 2, and the piezoelectric element 31 is in the feedback area 3.

The tactile feedback driving component 41 is configured to determine a touch position in response to a touch data acquired by the touch element 21; and determine a corresponding driving signal according to at least the touch area where the touch position is located; and input the driving signal to the piezoelectric element 31 to drive the piezoelectric element 31 to generate a tactile feedback.

In some embodiments, the base substrate 1 is a glass substrate.

It should be noted that FIG. 1 only shows a relative relationship of positions and areas of the components, and is not used to reflect a relationship of sizes of the components, the number of components, a connection relationship, or the like, and the technical solution of the present disclosure is not limited thereto.

Figure 2:
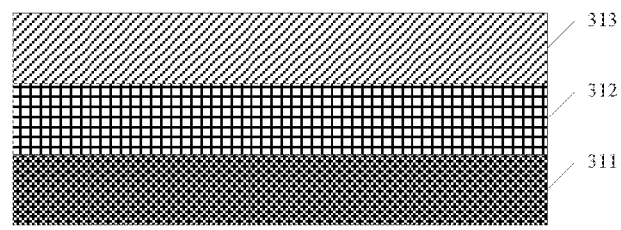
FIG. 2 is a schematic structural diagram of a piezoelectric element according to an embodiment of the present disclosure.

FIG. 2 is a schematic structural diagram of a piezoelectric element according to an embodiment of the present disclosure. As shown in FIG. 2, the piezoelectric element includes, a first electrode 311, a piezoelectric film 312, and a second electrode 313.

The first electrode 311, the piezoelectric film 312 and the second electrode 313 are sequentially stacked along a direction away from the base substrate. In some embodiments, the piezoelectric film 312 may be a piezoelectric film for PZT, a piezoelectric plate, or the like.

Accordingly, in some embodiments, the tactile feedback driving component is specifically configured to load a driving signal between the first electrode 311 and the second electrode 313 of the piezoelectric element to drive the piezoelectric element to generate the tactile feedback.

Figure 3:
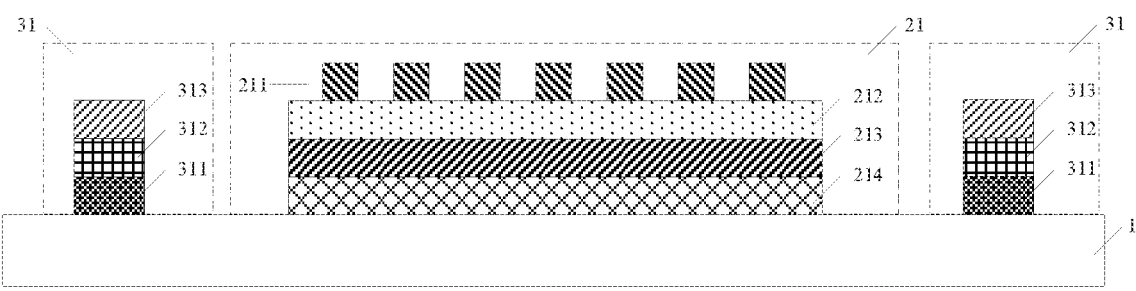
FIG. 3 is a schematic cross-sectional view of another tactile feedback device according to an embodiment of the present disclosure.

FIG. 3 is a schematic cross-sectional view of another tactile feedback device according to an embodiment of the present disclosure. FIG. 3 shows the base substrate 1, the touch element 21 and the piezoelectric element 31 provided on the base substrate 1 in the tactile feedback device. The touch element 21 includes a plurality of touch electrodes and a plurality of sensing electrodes, which are respectively located in a touch electrode layer 213 and a sensing electrode layer 211; and orthographic projections of the plurality of touch electrodes and the plurality of sensing electrodes on the base substrate 1 intersect with each other. As an optional embodiment, the plurality of piezoelectric elements 31 are provided in the feedback area of the tactile feedback device, as shown in FIG. 3, and on two opposite sides of the sensing area; each piezoelectric element 31 has a structure as shown in FIG. 2, and includes the first electrode 311, the piezoelectric film 312, and the second electrode 313.

In some embodiments, the first electrode 311 is disposed in the same layer as the touch electrode layer 213; and the second electrode 313 is disposed in the same layer as the sensing electrode layer 211; in some embodiments, the first electrode 311 and the touch electrode layer 213 may be disposed based on a multiplexing structure; in some embodiments, the second electrode 313 and the sensing electrode layer 211 may be disposed based on a multiplexing structure.

In some embodiments, the touch electrode is also referred to as a touch driving electrode. Specifically, in a working state, scanning signals are input to the touch electrodes line by line according to a preset scanning period, touch data are obtained according to output signals of the sensing electrodes, thereby achieving a mutual capacitance type touch sense.

In some embodiments, as shown in FIG. 3, the touch element 21 further includes an interlayer insulating layer 212 disposed between the touch electrode layer 213 and the sensing electrode layer 211, and a connection layer 214 between the touch electrode layer 213 and the base substrate 1. In some embodiments, the touch element 21 and the base substrate 1 are adhered together by the connection layer 214.

In some embodiments, the touch element 21 further includes a transparent protection layer (not shown) disposed on a side of the sensing electrode layer 211 distal to the base substrate 1, and a touch object acts on the transparent protection layer.

In some embodiments, a distance between the piezoelectric element 31 and the sensing area is greater than or equal to 100 microns. Specifically, an electric field near touch wiring is mainly concentrated in an area where an object touches, and a distribution of the electric field is very weak in the relative peripheral area or an area with a larger distance from the touch wiring. On this basis, a certain distance between the piezoelectric element 31 disposed in the feedback area and the sensing area is present, so that the piezoelectric element is further prevented from being affected by the electric field of the touch wiring.

It should be noted that, in the tactile feedback device in embodiments of the present disclosure, one or more piezoelectric elements 31 may be disposed in the feedback area, and the above arrangement of the plurality of piezoelectric elements 31 is only an optional implementation in the present disclosure, and does not limit the technical solution of the present disclosure. Moreover, the touch element 21 includes the plurality of touch electrodes and the plurality of sensing electrodes, and the specific structure of layers thereof, which are only an optional implementation in the present disclosure, and do not limit the technical solution of the present disclosure. Other configuration of the touch element is also applicable to the technical solution of the present disclosure. For example, in some embodiments, the touch element 21 may include a plurality of touch sensing electrode blocks, to implement a self-capacitance touch sensing.

Figure 4:
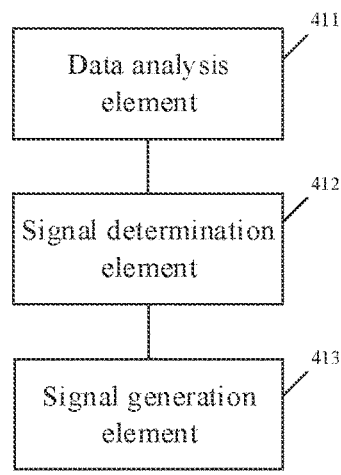
FIG. 4 is a schematic structural diagram of a tactile feedback driving component according to an embodiment of the present disclosure.

FIG. 4 is a schematic structural diagram of a tactile feedback driving component according to an embodiment of the present disclosure. As shown in FIG. 4, the tactile feedback driving component includes: a data analysis element 411, a signal determination element 412 and a signal generation element 413.

The data analysis element 411 is configured to determine, in response to the touch data acquired by the touch element, a touch action type and a touch position.

The signal determination element 412 is configured to determine the driving signal according to the touch area where the touch position is located and the touch action type.

The signal generation element 413 is configured to generate and output the driving signal.

In some embodiments, the signal determination element 412 is configured to determine that the driving signal is a first high-frequency continuous wave signal in response to the touch area where the touch position is located being an edge area of object and the touch action type being a slide type. In some embodiments, the first high-frequency continuous wave signal is a high-frequency continuous wave signal modulated by a sinc function, which is input to the piezoelectric element as a high-frequency excitation signal to generate a squeeze-film effect. When a touch object (such as a fingertip) interacts with a touch surface of the tactile feedback device, a friction force is provided at a corresponding touch position to generate an edge touch feeling. Specifically, a modulation frequency is in a range of 100 Hz to 200 Hz, and the number of cycles (a cycle number) is in a range of 10 to 70: the high-frequency continuous wave signal has a frequency in a range of 20 k to 100 kHz, and in some embodiments, has a frequency of 26.2 kHz.

In some embodiments, the signal determination element 412 is configured to determine that the driving signal is a low-frequency square wave pulse signal in response to that the touch area where the touch position is located is an internal area of an object and the touch action type is a press type. In some embodiments, the internal area of the object corresponds to an interaction area for keys and buttons; and the low-frequency square wave pulse signal is input to the piezoelectric element to generate vibrotactile feedback. Specifically, a frequency of the low-frequency square wave pulse signal may be 150 Hz, or 200 Hz, etc., and the number of cycles thereof may be 5 or 10.

In some embodiments, the signal determination element 412 is configured to determine that the driving signal is a second high-frequency continuous wave signal in response to the touch area where the touch position is located being a stripe area and the touch action type being a slide type. In some embodiments, the second high-frequency continuous wave signal is a high-frequency continuous wave signal modulated by a sinc function, which is input to the piezoelectric element as a high-frequency excitation signal to generate a squeeze-film effect. When the touch object interacts with the touch surface of the tactile feedback device, a friction force is provided at a corresponding touch position to generate a textured touch feeling. Specifically, a modulation frequency is in a range of 8 Hz to 20 Hz, and the cycle number is in a range of 10 to 70; a frequency of the high-frequency continuous wave signal is in a range of 20 kHz to 100 kHz, and in some embodiments, is 26.2 kHz. The modulation frequency corresponding to the first high-frequency continuous wave signal is greater than the modulation frequency corresponding to the second high-frequency continuous wave signal. In some embodiments, the first high-frequency continuous wave signal and the second high-frequency continuous wave signal are generated by the signal generation element based on the same high-frequency continuous wave signal through corresponding modulators, respectively.

In some embodiments, an output terminal of the signal generation element 413 is further coupled to an amplifying circuit, and the driving signal is output to the piezoelectric element through the amplifying circuit.

In some embodiments, the tactile feedback driving component further includes a timeout detection element (not shown in the drawings), by which a duration of outputting the driving signal by the signal generation element 413 is controlled.

Figure 5:
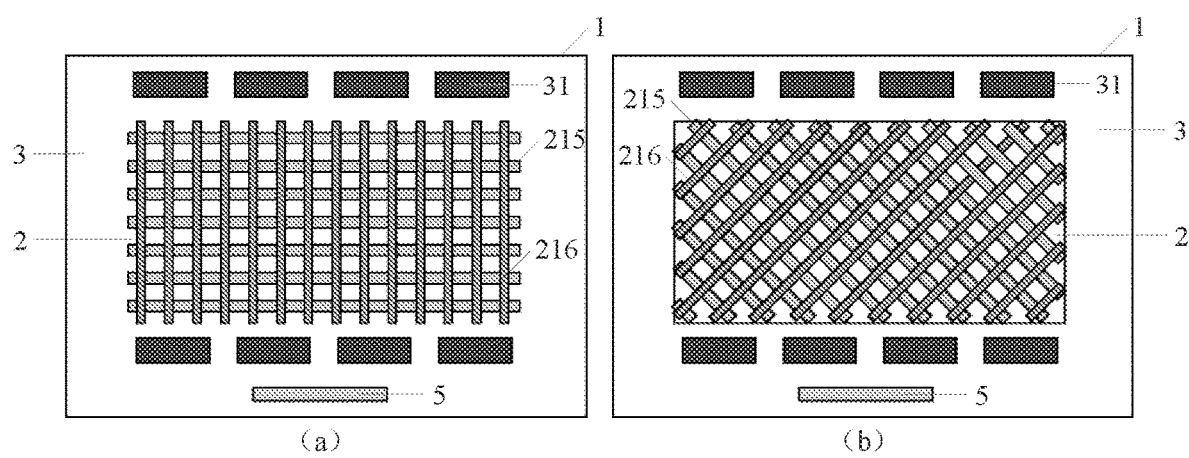
FIG. 5 is a schematic structural diagram of yet another tactile feedback device according to an embodiment of the present disclosure.
Figure 6:
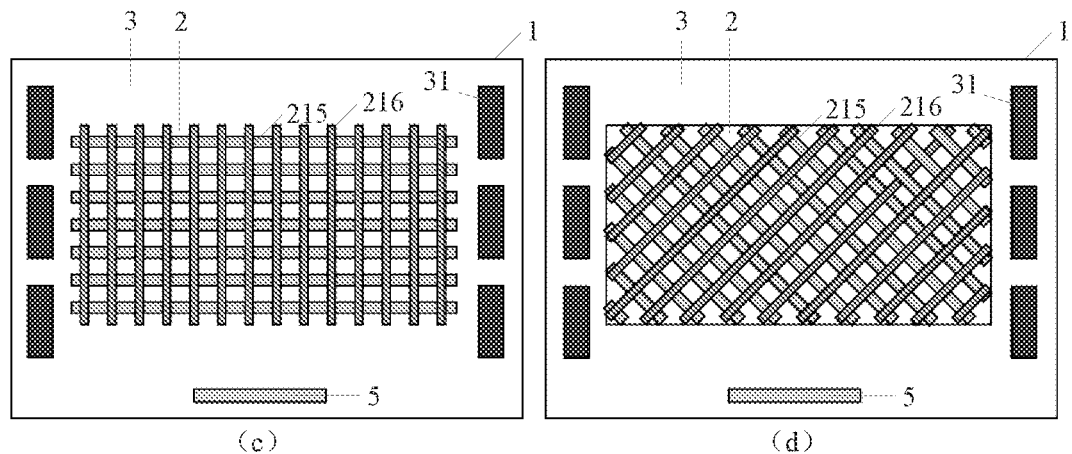
FIG. 6 is a schematic structural diagram of yet another tactile feedback device according to an embodiment of the present disclosure.
Figure 7:
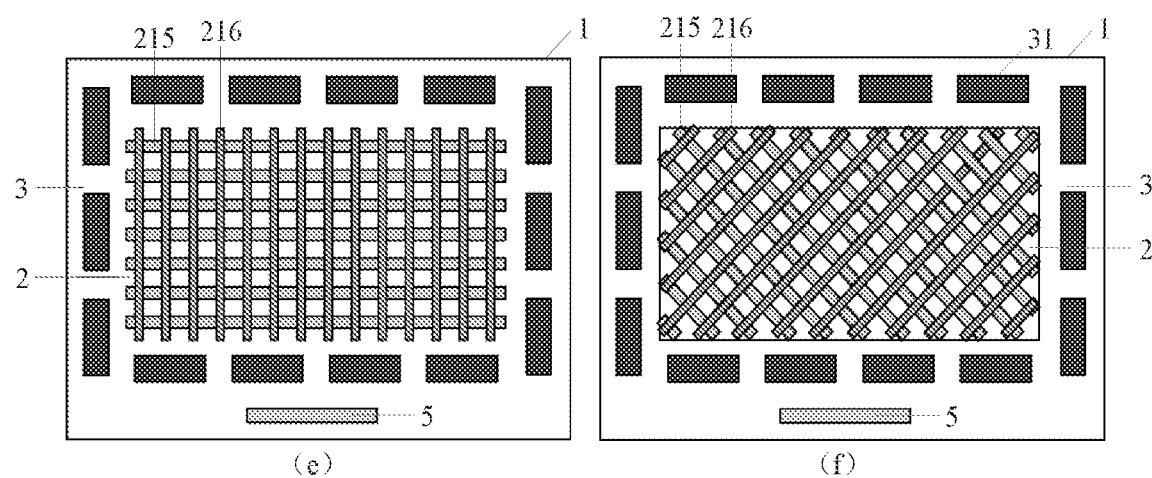
FIG. 7 is a schematic structural diagram of yet another tactile feedback device according to an embodiment of the present disclosure.

FIG. 5 is a schematic structural diagram of yet another tactile feedback device according to an embodiment of the present disclosure. FIG. 6 is a schematic structural diagram of yet another tactile feedback device according to an embodiment of the present disclosure. FIG. 7 is a schematic structural diagram of yet another tactile feedback device according to an embodiment of the present disclosure. As an optional embodiment, the tactile feedback device includes the sensing area 2 and the feedback area 3 surrounding the sensing area 2, and further includes a bonding area 5 at the periphery thereof; the tactile feedback device includes the base substrate 1, the touch element in the sensing area 2 and the piezoelectric element 31 in the feedback area 3, on the base substrate 1; the touch element includes a plurality of touch electrodes 215 and a plurality of sensing electrodes 216, and orthographic projections of the plurality of touch electrodes 215 and the plurality of sensing electrodes 216 on the base substrate 1 intersect with each other. Specifically, a plurality of piezoelectric elements 31 are provided at least on two opposite sides of the sensing area 2. As shown in FIG. 5, the plurality of piezoelectric elements 31 are disposed on two opposite sides of the sensing area 2 along a first direction. As an optional embodiment, the plurality of piezoelectric elements 31 are uniformly arranged. FIG. 5 (a) and FIG. 5 (b) show two arrangements of the plurality of touch electrodes 215 and the plurality of sensing electrodes 216 intersecting with each other in the arrangement of the piezoelectric elements 31, respectively. As shown in FIG. 6, the plurality of piezoelectric elements 31 are disposed on two opposite sides of the sensing area 2 along a second direction. As an optional embodiment, the plurality of piezoelectric elements 31 are uniformly arranged. FIG. 6 (c) and FIG. 6 (d) show two arrangements of the plurality of touch electrodes 215 and the plurality of sensing electrodes 216 intersecting with each other in the arrangement of the piezoelectric elements 31, respectively. As shown in FIG. 7, the plurality of piezoelectric elements 31 are uniformly arranged around the sensing area 2, that is, the plurality of piezoelectric elements 31 are disposed on two opposite sides of the sensing area 2 along the first direction and two opposite sides of the sensing area 2 along the second direction. FIG. 7 (e) and FIG. 7 (f) show two arrangements of the plurality of touch electrodes 215 and the plurality of sensing electrodes 216 intersecting with each other in the arrangement of the piezoelectric elements 31, respectively.

An embodiment of the present disclosure also provides a display apparatus, which includes: a display substrate and a tactile feedback device disposed on a display side of the display substrate; wherein the tactile feedback device adopts the tactile feedback device in any one of the above embodiments.

In some embodiments, the display substrate is an organic light-emitting diode (OLED) display substrate or an active matrix OLED (AMOLED) display substrate. In some embodiments, the display substrate includes an encapsulation layer, a light emitting layer, and a substrate that are sequentially stacked in a direction away from the display side. In some embodiments, the light emitting layer is positioned between an anode and a cathode, and may include: functional layers such as a hole injection layer, a hole transport layer, an electroluminescent layer, an electron injection layer and an electron transport layer.

Figure 8:
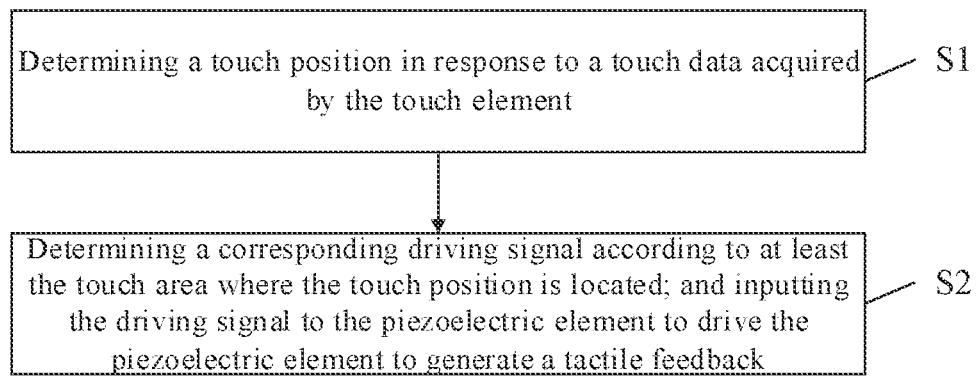
FIG. 8 is a flow chart of a tactile feedback method according to an embodiment of the present disclosure.

FIG. 8 is a flow chart of a tactile feedback method according to an embodiment of the present disclosure. In particular, the method is applied to the tactile feedback device including the sensing area and the feedback area surrounding the sensing area; the tactile feedback device includes: the base substrate, and the touch element in the sensing area and the piezoelectric element in the feedback area, on the base substrate. As shown in FIG. 8, the method includes the following Steps S1 and S2.

Step S1 includes determining a touch position in response to a touch data acquired by the touch element.

Step S2 includes determining a corresponding driving signal according to at least the touch area where the touch position is located; and inputting the driving signal to the piezoelectric element to drive the piezoelectric element to generate a tactile feedback.

In some embodiments, the step of determining a touch position in response to a touch data acquired by the touch element in step S1 includes: determining a touch action type and the touch position according to the touch data. The step of determining a corresponding driving signal according to at least the touch area where the touch position is located in step S2 includes: determining the driving signal according to the touch area where the touch position is located and the touch action type.

Specifically, in some embodiments, in step S2, it is determined that the driving signal is a first high-frequency continuous wave signal, in response to the touch area where the touch position is located being an edge area of an object and the touch action type being a slide type; it is determined that the driving signal is a low-frequency square wave pulse signal, in response to the touch area where the touch position is located being an internal area of an object and the touch action type being a press type; and it is determined that the driving signal is a second high-frequency continuous wave signal in response to the touch area where the touch position is located being a stripe area and the touch action type being a slide type.

The display apparatus and the tactile feedback method provided by the embodiments of the present disclosure are described in detail below in combination with practical applications.

Figure 9:
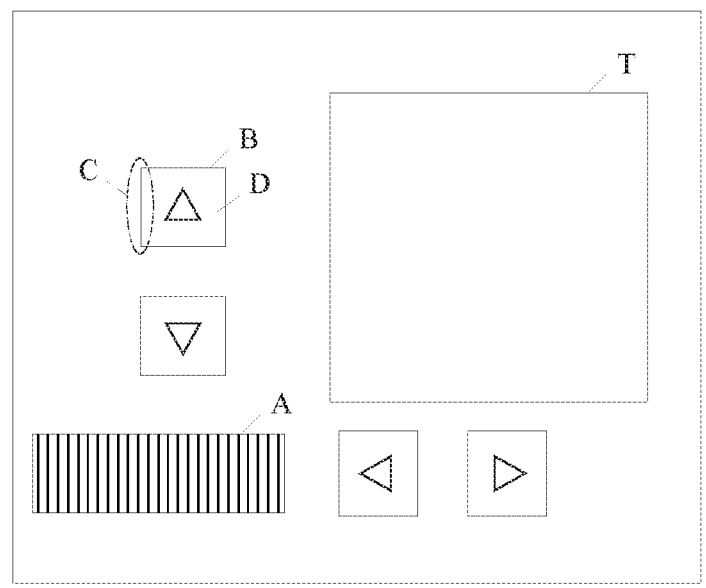
FIG. 9 is a schematic diagram of an interactive interface of a display apparatus according to an embodiment of the present disclosure.
Figure 10:
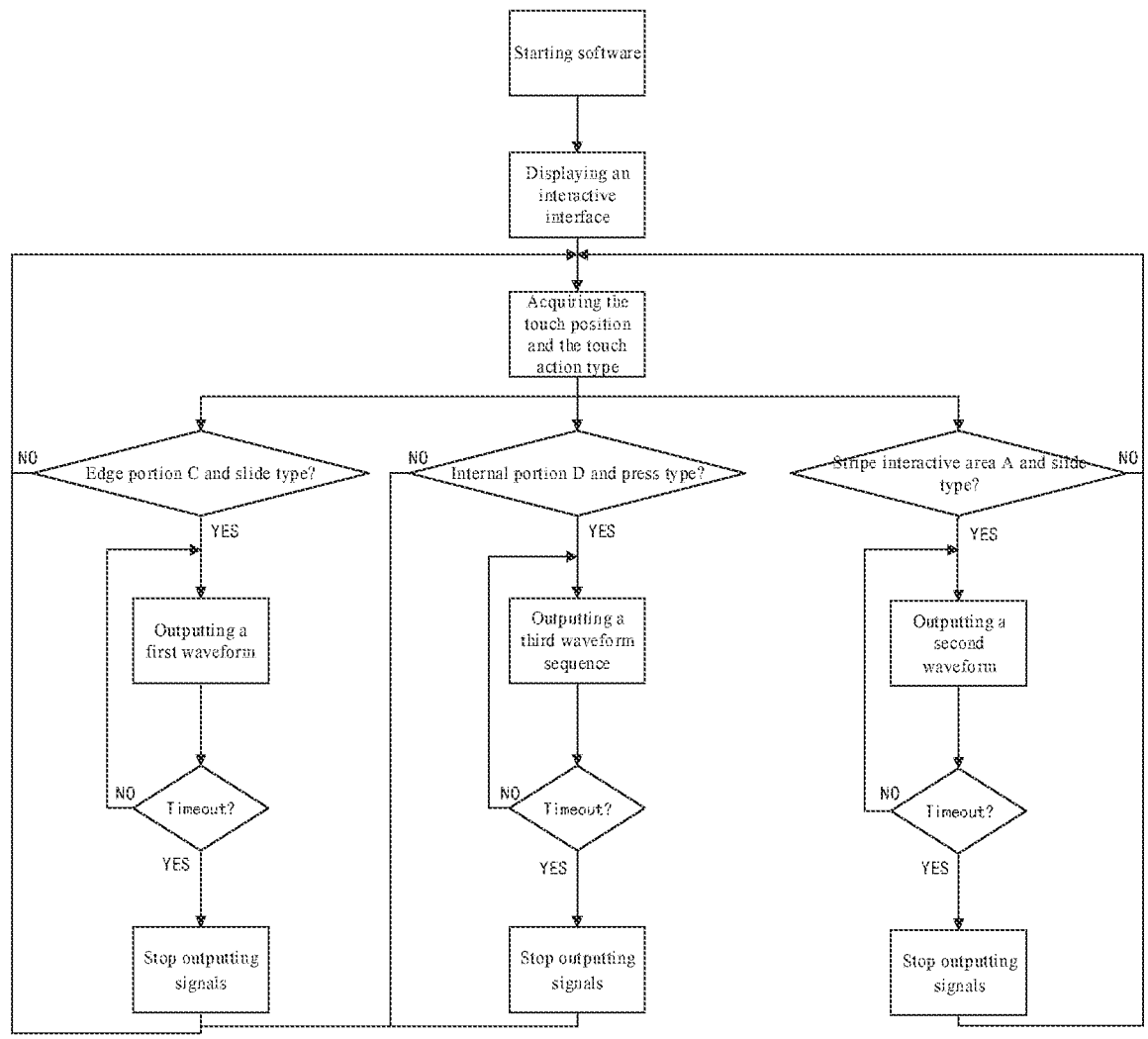
FIG. 10 is a flow logic diagram of a software control interface for a display apparatus according to an embodiment of the present disclosure.
Figure 11:
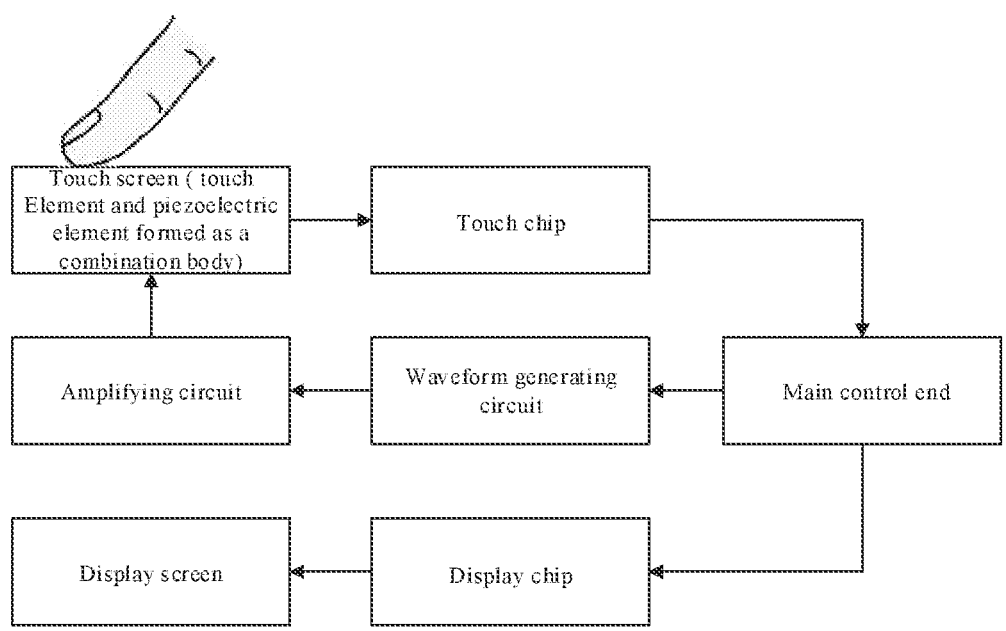
FIG. 11 is a flow chart of an operation state of a display apparatus according to an embodiment of the present disclosure.

FIG. 9 is a schematic diagram of an interactive interface of a display apparatus according to an embodiment of the present disclosure. FIG. 10 is a flow logic diagram of a software control interface for a display apparatus according to an embodiment of the present disclosure. FIG. 11 is a flow chart of an operating state of a display apparatus according to an embodiment of the present disclosure. Specifically, the display apparatus includes the display substrate and the tactile feedback device arranged on the display side of the display substrate. The tactile feedback device includes the sensing area and the feedback area surrounding the sensing area, and includes the touch element positioned in the sensing area, the piezoelectric element positioned in the feedback area and the tactile feedback driving component. As shown in FIG. 9, a pattern area T, a stripe interactive area A, and a plurality of keys (buttons) B are displayed on the interactive interface, and each key B includes an edge portion C and an internal portion D. A touch object, especially, a fingertip of a user, may change the display content of the pattern area T and the whole interactive interface by touching positions corresponding to the stripe interactive area A and the plurality of keys B and the like.

As shown in FIGS. 10 and 11, the display apparatus includes, based on a division manner for the control interface, a touch screen, a touch chip, a main control end (which is also called a host end including a central processing element and the like), a waveform generating circuit, an amplifying circuit, a display chip and a display screen. In an operation state, the software is started, and the display screen is controlled by the main control end to display an interactive interface; a user fingertip touches a touch surface of the touch screen including the touch element and the piezoelectric element which form a combination body for touch feedback; the touch element acquires the touch data and sends the touch data to the main control end through the touch chip; the main control end analyzes and processes the touch data to acquire the touch position and the touch action type. There are a number of situations at this time; the touch action type determined by the main control end is a slide type and the touch area where the touch position is located is an edge portion C of the key B, so that it is determined that a first waveform is to be output, and the first waveform corresponds to a high-frequency continuous wave signal modulated by a sinc function; the touch action type determined by the main control end is a press type, and a touch area where the touch position is located is an internal portion D of the key B, so that it is determined that a third waveform sequence is to be output, and the third waveform sequence corresponds to a low-frequency square wave pulse signal; the touch action type determined by the main control end is a slide type, and the touch area where the touch position is located is the stripe interaction area A, so that it is determined that a second waveform is to be output, and the second waveform corresponds to a high-frequency continuous wave signal modulated by a sinc function, and a modulation frequency corresponding to the second waveform is smaller than that corresponding to the first waveform. Then, the main control end controls the waveform generating circuit to generate a corresponding signal and perform timeout detection. Prior to timeout, the signal is output by the amplifying circuit to the piezoelectric element of the touch screen; the piezoelectric element generates a corresponding tactile feedback effect based on the signal; if timeout is detected, the signal output is stopped. Alternatively, if the main control end determines that the touch position and the touch action type do not meet the above situations, the real-time touch data is continuously analyzed and processed. In addition, the main control end controls an interactive interface in the display screen to change the display content through the display chip according to the touch data at the fingertip of the user.

According to the above situations, for the first waveform, the piezoelectric element generates a squeeze-film effect based on a high-frequency excitation signal corresponding to the first waveform, and provides a friction force to a fingertip of a user to generate an edge touch feeling; for the third waveform sequence, the piezoelectric element vibrates based on the low-frequency signal to generate a vibrotactile feedback; for the second waveform, the piezoelectric element generates a squeeze-film effect based on the high-frequency excitation signal, and provides friction force to a fingertip of a user to generate a textured touch feeling. In this way, the tactile feedback is achieved.

It will be understood by one of ordinary skill in the art that all or some of the steps of the methods, functional modules/units in the device, disclosed above may be implemented as software, firmware, hardware, and suitable combinations thereof. In a hardware implementation, the division between functional modules/units mentioned in the above description does not necessarily correspond to the division between physical components. For example, one physical component may have multiple functions, or one function or step may be performed by several physical components in cooperation. Some or all of the physical components may be implemented as software executed by a processor, such as a central processing unit, a digital signal processor, or a microprocessor, or as hardware, or as an integrated circuit, such as an application specific integrated circuit. Such software may be distributed on computer readable media, which may include computer storage media (or non-transitory media) and communication media (or transitory media). The term "computer storage media" includes volatile and nonvolatile, removable and non-removable media implemented in any method or technology for storage of information such as computer readable instructions, data structures, program modules or other data, as is well known to one of ordinary skill in the art. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by a computer. In addition, communication media typically contains computer readable instructions, data structures, program modules or other data in a modulated data signal, such as a carrier wave or other transport mechanism, and may include any information delivery media, as is well known to one of ordinary skill in the art.

Example embodiments have been disclosed herein, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one of ordinary skill in the art. Therefore, it will be understood by one of ordinary skill in the art that various changes in forms and details may be made therein without departing from the scope of the present disclosure as set forth in the appended claims.

What is claimed is:

1. A tactile feedback device, having a sensing area and a feedback area surrounding the sensing area, comprising: a base substrate, and a touch element, a piezoelectric element and a tactile feedback driving component on the base substrate, the touch element being in the sensing area, and the piezoelectric element being in the feedback area, wherein
the tactile feedback driving component is configured to:
determine a touch position in response to a touch data acquired by the touch element;
determine a corresponding driving signal according to at least a touch area where the touch position is located; and
input the driving signal to the piezoelectric element to drive the piezoelectric element to generate a tactile feedback, wherein
the piezoelectric element comprises: a first electrode, a piezoelectric film, and a second electrode sequentially stacked along a direction away from the base substrate,
the touch element comprises a plurality of touch electrodes, a plurality of sensing electrodes and an interlayer insulating layer between a layer in which the plurality of touch electrodes are located and a layer in which the plurality of sensing electrodes are located; orthographic projections of the plurality of touch electrodes and the plurality of sensing electrodes on the base substrate intersect with each other; and
a lower surface of the plurality of touch electrodes and an upper surface of the first electrode are at a first vertical level relative to the base substrate, and a lower surface of the plurality of sensing electrodes and an upper surface of the second electrode are at a second vertical level relative to the base substrate, and the first vertical level is different from the second vertical level.

2. The tactile feedback device of claim 1, wherein
the tactile feedback driving component comprises: a data analysis element, a signal determination element and a signal generation element;
the data analysis element is configured to determine, in response to the touch data acquired by the touch element, a touch action type and the touch position;
the signal determination element is configured to determine the driving signal according to the touch area where the touch position is located and the touch action type; and
the signal generation element is configured to generate and output the driving signal.

3. The tactile feedback device of claim 2, wherein
the signal determination element is configured to determine that the driving signal is a first high-frequency continuous wave signal in response to the touch area where the touch position is located being an edge area of an object and the touch action type being a slide type.

4. The tactile feedback device of claim 3, wherein
the signal determination element is configured to determine that the driving signal is a second high-frequency continuous wave signal in response to the touch area where the touch position is located being a stripe area and the touch action type being the slide type, and the first high-frequency continuous wave signal and the second high-frequency continuous wave signal have different frequencies.

5. The tactile feedback device of claim 4, wherein
the first high-frequency continuous wave signal and the second high-frequency continuous wave signal are high-frequency continuous wave signals modulated by a sinc function.

6. The tactile feedback device of claim 2, wherein
the signal determination element is configured to determine that the driving signal is a low-frequency square wave pulse signal in response to the touch area where the touch position is located being an internal area of an object and the touch action type being a press type.

7. The tactile feedback device of claim 2, wherein
the signal determination element is configured to determine that the driving signal is a second high-frequency continuous wave signal in response to the touch area where the touch position is located being a stripe area and the touch action type being a slide type.

8. The tactile feedback device of claim 1, wherein
the tactile feedback driving component is configured to load the driving signal between the first electrode and the second electrode of the piezoelectric element to drive the piezoelectric element to generate the tactile feedback.

9. The tactile feedback device of claim 1, wherein
a distance between the piezoelectric element and the sensing area is greater than or equal to 100 micrometers.

10. The tactile feedback device of claim 1, wherein
the piezoelectric element comprises a plurality of piezoelectric elements at least on two opposite sides of the sensing area.

11. The tactile feedback device of claim 10, wherein
the plurality of piezoelectric elements are uniformly distributed around the sensing area.

12. A display apparatus, comprising:
a display substrate and a tactile feedback device on a display side of the display substrate,
wherein the tactile feedback device is the tactile feedback device of claim 1.

13. The tactile feedback device of claim 1, wherein
the plurality of touch electrodes extend in a first direction, the plurality of sensing electrodes extend in a second direction intersecting with the first direction, and the piezoelectric element extends in the first direction.

14. The tactile feedback device of claim 1, wherein
the plurality of touch electrodes extend in a first direction, the plurality of sensing electrodes extend in a second direction intersecting with the first direction, and an extension direction of the piezoelectric element forms an acute angle with both the first direction and the second direction.

15. The tactile feedback device of claim 1, further comprising a connection layer between the plurality of touch electrodes and the base substrate, and is configured to adhere the touch element with the base substrate.

16. A tactile feedback method applied to a tactile feedback device, wherein the tactile feedback device has a sensing area and a feedback area surrounding the sensing area, wherein the tactile feedback device comprises: a base substrate, and a touch element, a piezoelectric element and a tactile feedback driving component on the base substrate, the touch element being in the sensing area, and the piezoelectric element being in the feedback area; and
wherein the method comprises:
determining a touch position in response to a touch data acquired by the touch element;

determining a corresponding driving signal according to at least a touch area where the touch position is located; and inputting the driving signal to the piezoelectric element to drive the piezoelectric element to generate a tactile feedback, wherein the piezoelectric element comprises: a first electrode, a piezoelectric film, and a second electrode sequentially stacked along a direction away from the base substrate, the touch element comprises a plurality of touch electrodes, a plurality of sensing electrodes and an interlayer insulating layer between a layer in which the plurality of touch electrodes are located and a layer in which the plurality of sensing electrodes are located; orthographic projections of the plurality of touch electrodes and the plurality of sensing electrodes on the base substrate intersect with each other; and a lower surface of the plurality of touch electrodes and an upper surface of the first electrode are at a first vertical level relative to the base substrate, and a lower surface of the plurality of sensing electrodes and an upper surface of the second electrode are at a second vertical level relative to the base substrate, and the first vertical level is different from the second vertical level.

17. The tactile feedback method of claim 16, wherein the determining a touch position in response to a touch data acquired by the touch element comprises:

determining a touch action type and the touch position according to the touch data; and the determining a corresponding driving signal according to at least a touch area where the touch position is located and inputting the driving signal to the piezoelectric element to drive the piezoelectric element to generate the tactile feedback comprises:

determining the driving signal according to the touch area where the touch position is located and the touch action type.

18. The tactile feedback method of claim 17, wherein the determining a corresponding driving signal according to at least a touch area where the touch position is located and the touch action type comprises:

determining that the driving signal is a first high-frequency continuous wave signal, in response to the touch area where the touch position is located being an edge area of an object and the touch action type being a slide type;

determining that the driving signal is a low-frequency square wave pulse signal, in response to the touch area where the touch position is located being an internal area of the object and the touch action type being a press type; and determining that the driving signal is a second high-frequency continuous wave signal in response to the touch area where the touch position is located being a stripe area and the touch action type being the slide type.

\* \* \* \* \*